Aug. 11, 1959 R. G. FLOWERS 2,899,399
ETHOXYLINE RESIN-SHELLAC-DICYANDIAMIDE INSULATION COMPOSITION
Filed Aug. 31, 1956
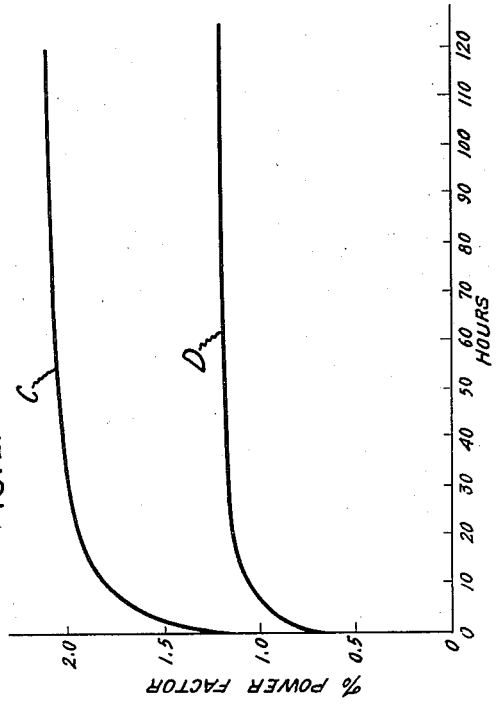
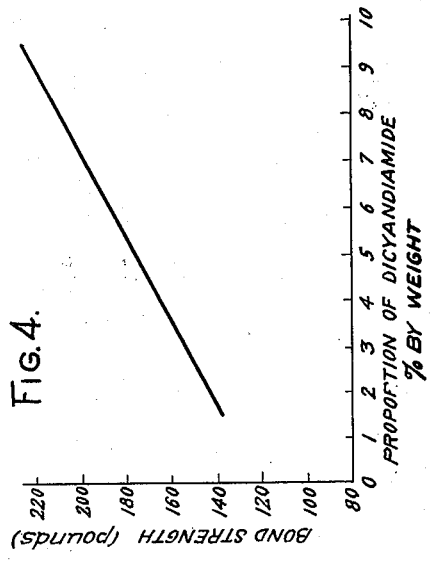
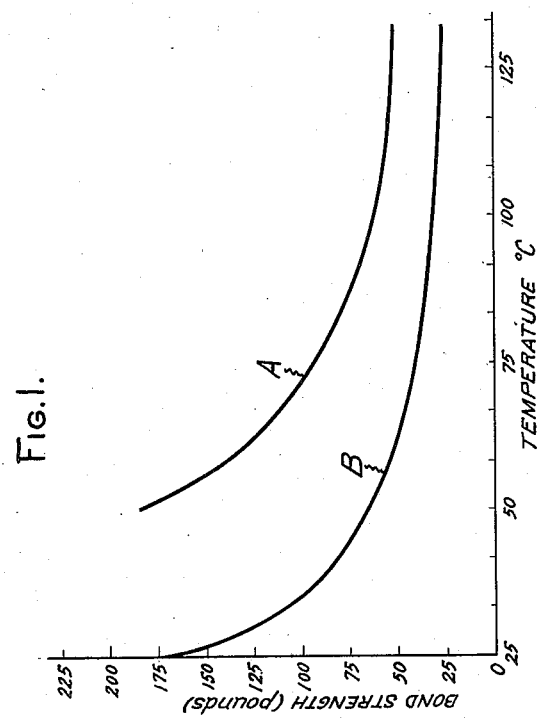
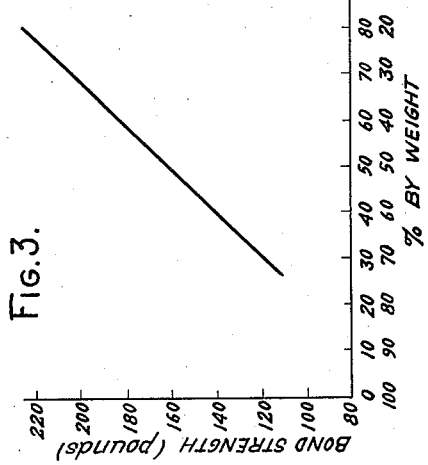
Inventor:
Ralph G. Flowers
by His Attorney

United States Patent Office 2,899,399
Patented Aug. 11, 1959

2,899,399

ETHOXYLINE RESIN-SHELLAC-DICYANDIAMIDE INSULATION COMPOSITION

Ralph G. Flowers, Pittsfield, Mass., assignor to General Electric Company, a corporation of New York Application August 31, 1956, Serial No. 607,434

4 Claims. (Cl. 260—24)

The present invention relates to resinous insulating compositions, and more particularly to resinous electrical insulation material suitable as a coating and impregnating varnish for protective, bonding and laminating purposes. The insulating material of the present invention is particularly adapted for use as a bonding varnish for transformer coils and other electrical apparatus, and for wound or laminated insulating sheet material, such as paper and the like.

In the past, such materials as shellac and phenolic resins have been employed as treating varnishes for the above purposes, but their use has had various drawbacks. Phenolic resins, for example, tended to be too brittle. On the other hand, shellac used alone became softened at elevated temperatures, and when used in a dipping bath tended to thicken and had to be discarded after relatively short use. These and other treating varnishes used heretofore also were unsatisfactory in such respects as inadequate bonding strength to permit the bonded coils or turns to withstand severe handling operations, or deteriorated or caused contamination under operational use in dielectric liquids associated with electrical apparatus, or were unsuitable for other reasons.

It is an object of the present invention to provide a resinous insulating composition of the above type which overcomes the disadvantages of the prior types of treating varnishes and which has improved bonding strength and electrical properties, and to provide a method of making the same.

It is another object of the invention to provide articles incorporating the above improved resinous insulating composition, either in cast, bonded or laminated form.

The present insulating composition represents an improvement over the material disclosed and claimed in copending application Serial No. 344,892—Flowers and Holmberg, filed March 26, 1953, and assigned to the same assignee as the present invention. The resin composition disclosed in the copending application consisted of the reaction product of an ethoxyline resin and natural shellac which was characterized by improved mechanical and electrical properties as compared to the prior types of varnish materials.

It has been found in accordance with the present invention that by combining shellac, an epoxy resin and dicyandiamide, and suitably curing the resulting mixture there is obtained a hardened resinous material suitable for many electrical and other applications and one that not only retains all the advantages of the shellac-ethoxyline resin material disclosed in the above copending application, such as low moisture absorption, high dielectric strength and excellent solvent resistance, but in addition is characterized by bonding strength and electrical properties superior to the aforesaid shellac-ethoxyline resin combination.

The invention will be better understood by reference to the following description taken in conjunction with the accompanying drawing, in which:

Fig. 1 graphically illustrates the improved bonding strength of an embodiment of the present composition;

Fig. 2 shows the improved electrical characteristics of a resinous composition in accordance with the invention;

Fig. 3 is a graphical showing of the variation of bond strength of the present resin material with varying proportions of the shellac and epoxy resin components; and Fig. 4 similarly shows the effect on bond strength by variation of the dicyandiamide proportion.

The ethoxyline resins which may be used in practicing the present invention, which are also known as epoxide or epoxy resins, are described, for example, in U.S. Patent 2,324,483, Castan, as comprising the product of reaction of a phenol having at least two phenolic hydroxy groups and an epihalogenohydrin, e.g., epichlorohydrin, in which the said product contains at least two ethylene oxide groups.

The ethoxyline resins, which may be defined generally as being complex epoxide resins comprising a polyether derivative of a polyhydric organic compound containing epoxy groups, are also disclosed in various places in the art. Among such references may be mentioned, in addition to the aforesaid Castan Patent 2,324,483, Castan Patent 2,444,333, British Patent 518,057, and British Patent 579,698. For the most part, these ethoxyline resins are based on the resinous product of reaction between the epihalogenohydrin, for instance, epichlorohydrin, and a phenol having at least two phenolic hydroxy groups, for example, bis-(4-hydroxy-phenyl) dimethylmethane. U.S. Patents 2,494,295, 2,500,600 and 2,511,913, also describe examples of ethoxyline resinous compositions which may be employed in the practice of the present invention. By reference, the aforementioned patents are intended to be part of the present description of the ethoxyline resins used and, for brevity, the ethoxyline resins will not be described other than that they contain more than one ethylene oxide group, e.g., from 1 to 2 or more epoxide groups per molecule, and are prepared by effecting reaction between a polyhydric phenol, for example, hydroquinone, resorcinol, and condensation products of phenols with ketone, for instance, bis-(4-hydroxyphenyl)-2,2-propane, with epichlorohydrin. For example, the reaction of epichlorohydrin with bis-(4-hydroxyphenyl)-2,2-propane may be formulated as follows:

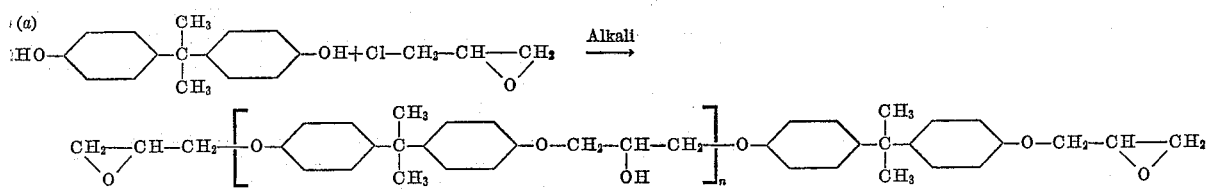

where $n$ has an average value varying from around zero to about 7. Many of these ethoxyline resins are sold under the name of Epon resins by Shell Chemical Corporation, or Araldite resins by the Ciba Company. Another type of ethoxyline resin suitable for use in the present invention is sold under the name Cardolite by the Irvington Varnish and Insulator Company, a division of Minnesota Mining and Manufacturing Company. The latter is an epoxy resin derived from a mixture of poly- (hydroxyphenyl) pentadecanes, a major constituent of the latter being:

(b)
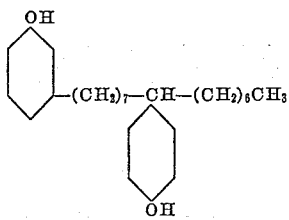

Data on the Epon resins are given in the table below, all of the resins listed being believed to have the composition as set forth in Formula a above:

TABLE I

| Epon No. | Epoxide Equivalent | Approximate Esterification Equivalent | M.P., °C. |
|---|---|---|---|
| 1004 | 905–985 | 175 | 97–103 |
| 1007 | 1,600–1,900 | 190 | 127–133 |
| 1009 | 2,400–4,000 | 200 | 145–155 |
| 1001 | 450–525 | 130 | 64–76 |

These complex resins contain epoxide groups or epoxide and hydroxyl groups as their functional groups and are generally free from other functional groups such as basic and acidic groups. It will be noted that in actual practice it is necessary to react these resins with a hardener or catalyst for the purpose of effecting a cure thereof to a solid usuable state.

However, for many applications these resins have not been completely satisfactory from a commercial point of view. The shelf-life of these materials is of short duration, especially those using certain basic hardeners. The resin products using other types of hardeners often have poor electrical properties. Use of hardeners composed of polybasic acid anhydrides is often limited by their high volatility. These disadvantages coupled with their uneconomical relationship to other resins has made the use of such epoxy resins for many electrical insulation applications impractical.

It was found in accordance with the invention disclosed in the above copending application that the addition of natural shellac in a range of 10–90% by weight to the ethoxyline resin effected a curing action to harden the resin even in the absence of the usual hardeners commonly employed with epoxy resins. It has now been discovered in accordance with the present invention that the further addition of dicyandiamide to the shellac-ethoxyline resin mixture confers markedly improved bonding strength to the hardened resin. When used, therefore, as a varnish for treating electrical conductors to be bonded together, such as transformer coils, the present resin composition enables the treated coil to be subjected to severe handling conditions during transformer assembly, shipment and operation without its turns becoming separated or loosened. Furthermore, it has been found that the shellac-epoxy-dicyandiamide resin composition is characterized by an exceptionally low power factor which is substantially below that of the shellac-epoxy combination, and, as such, contributes to a material reduction of the current losses and generation of excessive heat from the electrical apparatus in which it is incorporated.

The present compositions may be prepared by dissolving the three constituents, all of which are in solid form, in a common solvent, as, for example, ethylene glycol monoethylether. The varnish solution thus obtained can be applied to the desired structure, e.g., a transformer coil, such as by dipping the coil into the varnish bath, and the composite resin cured at about 125° C. for several hours, i.e., a sufficient period to effect reaction among the components, as determined, for example, by attaining a suitably low power factor. Other means of application, such as painting, spraying, brushing or the like, may be used if desired.

The varnish may be employed in the above and various other applications with or without a solvent, and is suitable for impregnating, coating and bonding sheet material such as paper, pressboard, cloth and the like, which can be used for forming wound cylinders, flat laminates, or other types of laminated products. These products are particularly useful for electrical apparatus applications such as dielectric barrier and bushing cores, and due to the improved bonding strength imparted by the present resin composition are able to withstand great physical and electrical stresses without fracture or deformation.

Fig 1 shows comparative bonding strengths of composite structures treated respectively with a shellac-epoxy resin and a shellac-epoxy-dicyandiamide resin. In these tests the samples were prepared by clamping short lengths of paper and cotton-covered rectangular wire together and treating them with the respective varnishes. The samples in one group were treated with a solution of 60 parts by weight of dewaxed lemon shellac and 40 parts of Epon 1001 in ethylene glycol monoethylether, and a second group with a solution similar to that of the first group except that Epon 1004 was used. A third group, representative of the present invention, was treated with the following varnish composition, the proportions specified being in parts by weight:

*Example I*

|  | Parts |
|---|---|
| Dewaxed lemon shellac | 60 |
| Epon 1004 | 40 |
| Dicyandiamide | 6 |

The solvent for the above mixture was also ethylene glycol monoethylether.

The samples were cured for several hours at 125° C. Before testing the bond strength of the samples they were all aged for one week in a liquid dielectric material of the chlorinated hydrocarbon type to more nearly approximate the conditions prevailing in a transformer where the bonded coils are immersed in a similar dielectric liquid. The test was carried out by subjecting the bonded conductors in each sample to a separating force as applied by a standard tensile strength testing device.

In the Fig. 1 graph, the bond strength in pounds is plotted against the temperature in degrees centigrade at which the samples were heated while in the standard tensile strength testing device. Curve A represents the average of several samples using the composition of Example I, while curve B represents samples of both the shellac-epoxy groups mentioned above, the latter groups producing substantially similar test results. As will be noted from the graph, the samples using the present composition represented by curve A were characterized by considerably higher bond strength especially at the lower temperatures. At 50° C., for example, the present composition exhibited a bond strength about three times that of the shellac-epoxy resin bonding material and throughout the range of temperature of 50° C.–125° C. maintained on the average about a two-fold superiority over the comparative material in strength characteristics.

Fig. 2 illustrates a graph in which percent power factor is plotted against the time in hours of aging samples in a liquid halogenated hydrocarbon dielectric material. Curve C represents samples similar to those described above bonded with a resin composed of a mixture of 60 parts shellac and 40 parts of Epon 1001 in ethylene glycol monoethylether, while curve D represents those bonded with a resin of the following composition:

*Example II*

|  | Parts |
|---|---|
| Shellac | 60 |
| Epon 1001 | 40 |
| Dicyandiamide | 6 |

As shown, from even initial aging periods to the maximum period tested of 120 hours, the present composition showed considerably reduced power factor amounting on the average to about 40% decrease as compared to the shellac-epoxy combination.

In the present composition, the shellac and epoxy resin form the major portion and can be used in widely varying ratios, while the dicyandiamide is used in relatively small amounts but also may vary in amount while still producing improved results in accordance with the invention. Preferably, the present composition has the following approximate range of proportions of the constituents in percent by weight:

| | Percent |
|---|---|
| Shellac | 25–90 |
| Epoxy resin | 9–70 |
| Dicyandiamide | 1–10 |

The use of shellac in amounts greater than 90% is not desirable since the thermosetting properties of the hardened resin could not thereby be obtained. Less than 25% shellac will not provide sufficient amounts of this component to confer on the epoxy resin optimum mechanical and electrical properties. With respect to the dicyandiamide, more than 10% of this component presents difficulties in properly dissolving it in the mixture, whereas less than 1% provides negligible improvement in the final product as compared to the shellac-epoxy resin combination. In particular, a range of about 60 to 30% shellac, 30 to 60% epoxy resin and about 4 to 10% of dicyandiamide appear to be the optimum amounts for commercial application.

Fig. 3 graphically shows the effect on bond strength of the resulting resin product where, with a constant proportion of dicyandiamide, the relative proportions of shellac and epoxy resin are varied. In the particular case illustrated, the composite resin consisted of 1050 parts by weight of shellac and epoxy resin, and 63 parts of dicyandiamide. As indicated by the graph, wherein the bond strength in pounds measured at 100° C. is plotted against varying proportions of shellac and epoxy resin in percent by weight, the bonding strength of the resultant resin increases with an increase in the proportion of shellac relative to the epoxy resin.

In Fig. 4 there is shown the result of changing the proportion of dicyandiamide using a constant amount of ethoxyline and shellac, in this case the shellac-epoxy resin ratio being about 60-40 and the bond strength also being measured at 100° C. As illustrated, the bond strength also rises with increased amounts of dicyandiamide within the preferred range of about 1 to 10% by weight.

In addition to the particular compositions set forth above, the following compositions further exemplify resin combinations in accordance with the present invention, it being understood that the aforementioned and following examples are merely illustrative and not intended to limit the scope of the invention:

Example III

| | Grams |
|---|---|
| Dewaxed lemon shellac | 840 |
| Cardolite 7019 | 210 |
| Dicyandiamide | 84 |
| Ethylene glycol monoethylether | 2150 |

Tests made of the bond strengths of bonded wire samples coated with this varnish showed strengths of 362 pounds at 75° C., 263 pounds at 100° C., and 140 pounds at 125° C.

Example IV

The following composition provided a bond strength of 116 pounds at 100° C.:

| | Grams |
|---|---|
| Dewaxed lemon shellac | 310 |
| Epon 1004 | 740 |
| Dicyandiamide | 63 |
| Ethylene glycol monoethylether | 2150 |

Example V

The following composition gave a bond strength of 206 pounds at 100° C.:

| | Grams |
|---|---|
| Dewaxed lemon shellac | 740 |
| Epon 1004 | 310 |
| Dicyandiamide | 63 |
| Ethylene glycol monoethylether | 2150 |

Suitable organic solvents other than ethylene glycol monoethylether may be used in preparing the present varnish materials. Specific examples of other solvents found satisfactory are a mixture of 70 parts ethyl alcohol and 30 parts toluene; a mixture of 73 parts trichloroethylene and 27 parts ethyl alcohol; and a mixture of 5 parts ethyl alcohol, 2 parts toluene and 1 part ethyl acetate.

A further example of a composition of the present material found particularly useful in winding convolute insulating cylinders composed of kraft paper is the following, the amounts being in parts by weight:

Example VI

| | Parts |
|---|---|
| Epon 1004 | 24 |
| Cardolite 7019 | 7.5 |
| Cardolite 6885 (plasticizer) | 1.7 |
| Shellac | 22.5 |
| Dicyandiamide | 2.25 |
| Ethyl alcohol | 16 |
| Ethylene glycol monoethylether | 48 |

From the foregoing it will be apparent that the ethoxyline-shellac-dicyandiamide mixtures of the present invention are particularly adapted for use in various forms and many applications where mechanical strength requirements, and notably bonding effectiveness, coupled with superior electrical properties, are of major importance. In particular, the present materials are of advantage where used for treating electrical components coming into contact with liquid dielectrics, especially of the halogenated aryl hydrocarbon type, since the resin product not only has exceptional mechanical and electrical stability under such conditions even at elevated temperatures, but, equally important, does not contaminate the liquid dielectric medium.

While the invention has been described with specific reference to a combination of ethoxyline resin and effective quantities of shellac and dicyandiamide in varying amounts as essential ingredients, it is to be understood that it is not restricted thereto. For example, other resins of the type commonly employed as extenders or modifiers for the ethoxyline resins may also be used without departing from the spirit or scope of the invention. Likewise, filler materials may be used therein which do not affect the essential properties of the resin combination as disclosed herein. It will be understood, therefore, that modifications may be made by those skilled in the art without actually departing from the scope of the invention, and that the appended claims are intended to cover all such equivalent variations as come within the true spirit and scope of the invention.

What I claim as new and desire to secure by Letters Patent of the United States is:

1. A composition of matter comprising the product obtained by reacting (1) about 9–70% by weight of an ethoxyline resin comprising the reaction product of a dihydric phenol and an epihalogenohydrin, (2) about 25–90% by weight of shellac and (3) about 1–10% by weight dicyandiamide.

2. A composition of matter obtained by heating a mixture of ingredients comprising (1) 30–60% by weight of an ethoxyline resin comprising the reaction product of a dihydric phenol and an epihalogenohydrin, (2) 60–30% shellac and (3) 4–10% dicyandiamide.

3. An article of manufacture comprising a laminated product composed of a plurality of layers of sheet material bonded together with the product obtained by reacting (1) 9–70% by weight of an ethoxyline resin comprising the reaction product of a dihydric phenol and an epihalogenohydrin, (2) 25–90% of shellac and (3) 1–10% of dicyandiamide.

4. The process of making a thermosetting resin characterized by high bonding strength which comprises (a) forming a mixture of ingredients comprising (1) 9–70% by weight of an ethoxyline resin comprising the reaction product of a dihydric phenol and epihalogenohydrin, (2) 25–90% shellac and (3) 1–10% dicyandiamide, said ingredients being dissolved in an organic solvent, and (b) heating the aforesaid mixture for a time and at a temperature to effect reaction among the ingredients.

References Cited in the file of this patent

UNITED STATES PATENTS

| | | |
|---|---|---|
| 2,010,224 | Gardner | Aug. 6, 1935 |
| 2,637,715 | Ott | May 5, 1953 |
| 2,769,739 | Flowers | Nov. 6, 1956 |
| 2,786,794 | Gams et al. | Mar. 26, 1957 |

OTHER REFERENCES

Schildknecht (article by Stivala), pages 462–467, Polymer Processes, Interscience (1956). (Copy in Sci. Libr.) Received U. S. Patent Office, May 17, 1956.